US008816940B2

(12) United States Patent
Daniel et al.

(10) Patent No.: US 8,816,940 B2
(45) Date of Patent: *Aug. 26, 2014

(54) MODULATING THICKNESS OF COLORED FLUID IN COLOR DISPLAY

(71) Applicants: Jergens Hans Daniel, Washington, DC (US); Michael Bassler, Mainz (DE)

(72) Inventors: Jergens Hans Daniel, Washington, DC (US); Michael Bassler, Mainz (DE)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,447

(22) Filed: Dec. 17, 2012

(65) Prior Publication Data

US 2013/0100519 A1    Apr. 25, 2013

Related U.S. Application Data

(62) Division of application No. 12/240,810, filed on Sep. 29, 2008, now Pat. No. 8,350,782.

(51) Int. Cl.
*G09G 3/34* (2006.01)
*H05B 33/12* (2006.01)

(52) U.S. Cl.
CPC . *H05B 33/12* (2013.01); *G09G 3/34* (2013.01)
USPC ........... 345/55; 359/886; 359/228; 40/299.01

(58) Field of Classification Search
CPC ........................................................ H05B 33/12

USPC ............. 345/55; 359/228, 296, 886; 977/742; 40/299.01

See application file for complete search history.

(56) References Cited

U.S. PATENT DOCUMENTS

| 5,731,792 | A  | * | 3/1998 | Sheridon ........................ 345/84 |
| 8,350,782 | B2 | * | 1/2013 | Daniel et al. .................. 345/55 |
| 2005/0206096 | A1 | * | 9/2005 | Browne et al. ............... 277/628 |
| 2009/0279158 | A1 |   | 11/2009 | Peeters et al. |

OTHER PUBLICATIONS

Goodrich, George W., et al., "Dye-Foil Digital Display", SID 80 Digest, p. 130-131, 1980.
Velde, Ties S. te, "A Family of Electroscopic Displays", SID 80 Digest, p. 116-117, 1980.

* cited by examiner

*Primary Examiner* — Syed A Islam
(74) *Attorney, Agent, or Firm* — Blakely Sokoloff Taylor & Zafman LLP

(57) ABSTRACT

An embodiment is a display unit. The display unit includes a substrate layer, a layer of colored fluid on the substrate layer, and a transparent actuator element on the layer of the colored fluid. The layer of colored fluid has a thickness and a color. The transparent actuator element modulates the thickness of the colored fluid upon activated by a force such that the colored fluid is changed from a first state to a second state or vice versa. The modulated thickness provides a variable optical density of the colored fluid.

8 Claims, 17 Drawing Sheets

STATE A

STATE B

STATE A

STATE B

STATE A

STATE B

MODULATING THICKNESS OF COLORED FLUID IN COLOR DISPLAY

CROSS-REFERENCE TO RELATED APPLICATIONS

The current application is a continuation application of U.S. patent application Ser. No. 12/240,810 (20071062-US-NP), filed on Sep. 29, 2008, and now patented as U.S. Pat. No. 8,350,782, which application is specifically incorporated herein, in its entirety, by reference.

BACKGROUND

1. Technical Field

The presently disclosed embodiments are directed to the field of display technology, and more specifically, to color display.

2. Background

Display technologies have been developed to provide displays used in a wide range of applications from hand-held devices to flat-panel television set. Conventional color displays usually employ a display medium which changes in brightness and color filters on adjacent pixels, typically red, green, and blue (RGB) filters. In reflective displays the color saturation and the white/black states are not very good when using this method. Ideally, color is generated similar to printing or photography by overlaying cyan/magenta/yellow filter layers. However, this is difficult to achieve in an electronic display which requires changing the state, i.e., color, of the display.

Existing techniques to provide reflective displays have a number of drawbacks. The liquid crystal based techniques may have low reflectivity, poor contrast ratios, and poor color saturation. The micro-electromechanical approaches may also have limited reflectivity and poor color saturation. In addition, approaches that employ stacked display panels of different colors such as stacked cholesteric liquid crystal displays may be complex to fabricate and expensive.

SUMMARY

One disclosed feature of the embodiments is a display unit. The display unit includes a substrate layer, a layer of colored fluid on the substrate layer, and a transparent actuator element on the layer of the colored fluid. The layer of colored fluid has a thickness and a color. The transparent actuator element modulates the thickness of the colored fluid upon activated by a force such that the colored fluid is changed from a first state to a second state, or vice versa. The modulated thickness provides a variable optical density of the colored fluid.

One disclosed feature of the embodiments is a method for color display. A plurality of layers of colored fluid is stacked on each other. Each of the colored fluid has a color and a thickness and is on a substrate layer. A force is activated on a transparent actuator element on each of the layers of the colored fluid to modulate the thickness such that the colored fluid is changed from a first state to a second state or vice versa. The modulated thickness provides a variable optical density of the colored fluid layer.

One disclosed feature of the embodiments is a method to construct a color display unit. A layer of colored fluid is deposited on a substrate layer. The layer of colored fluid has a thickness and a color. A transparent actuator element is formed on the layer of the colored fluid. An actuation mechanism is formed to create a force causing movement of the transparent actuator element when activated, the movement of the transparent actuator element modulating the thickness of the layer of colored fluid such that the colored fluid is changed from a first state to a second state or vice versa. The modulated thickness provides a variable optical density of the colored fluid.

BRIEF DESCRIPTION OF THE DRAWINGS

Embodiments may best be understood by referring to the following description and accompanying drawings that are used to illustrate embodiments. In the drawings.

DETAILED DESCRIPTION

Figure 1:
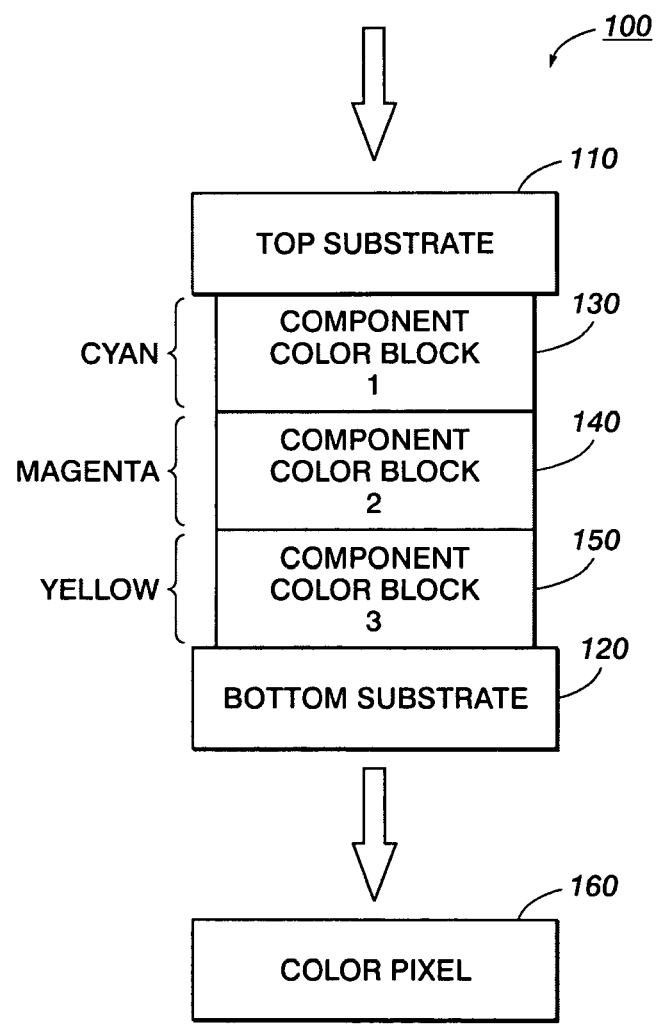
FIG. 1 is a diagram illustrating a display unit in which one embodiment may be practiced.

One disclosed feature of the embodiments is a display unit. The display unit includes a substrate layer, a layer of colored fluid in a color on the substrate layer, and a transparent actuator element on the layer of the colored fluid. The layer of colored fluid has a thickness and a color. The transparent actuator element modulates the thickness of the colored fluid upon activated by a force such that the colored fluid is changed from a first state to a second state or vice versa. The modulated thickness provides a variable optical density of the colored fluid layer.

In the following description, numerous specific details are set forth. However, it is understood that embodiments of the invention may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

One disclosed feature of the embodiments is a technique for color reflective or transmissive displays. The technique includes a stack of component blocks (e.g., cyan, magenta, yellow) color pixel architecture. Each component block includes a layer of colored fluid and an actuator element. The saturation of each color may be changed over its range by modulating the thickness of the colored fluid underneath the actuator element such that the colored fluid is changed from a first state to a second state. The two states are different in their volume geometry or state. In one embodiment, the first state corresponds to a substantially planar configuration, state, or geometry and the second state corresponds to a substantially vertical configuration, state, or geometry of the colored fluid volume, with respect to the substrate. In another embodiment, the first state corresponds to a substantially vertical configuration, state, or geometry and the second state corresponds to a substantially planar configuration, state, or geometry of the colored fluid volume. The thickness of the colored fluid layer may be modulated by moving the actuator element with respect to the colored fluid. The colored fluid is moved in response to the movement of the actuator element, thus changing its layer thickness, resulting in variable optical density. The variable optical density provides controllable color contribution from each of the component colors in the color system. The actuation mechanism to move the actuator element may be one of electric, magnetic, electrostatic, bimetallic, thermal, artificial muscles, electro-mechanical, chemo-mechanical, shape-memory actuator, or any other suitable mechanism. The technique offers simple fabrication process and scalable large display size.

FIG. 1 is a diagram illustrating a display unit 100 in which one embodiment may be practiced. The display unit 100 includes top and bottom substrates 110 and 120, and three component color blocks 130, 140, and 150. The display unit 100 represents a reflective or transmissive display of a pixel in color. A reflective display relies on the ambient light for the display of the pixel. A transmissive display uses a backlight to illuminate the pixel. The display unit 100 may be used in photography, printing, advertisement, signage, entertainment, or any other applications that need a versatile color display.

The top and bottom substrates 110 and 120 provide mechanical and optical sealing for the stacked component color blocks 130, 140, and 150. The top substrate 110 receives light from an illuminating light source whether from the ambient light or a back light illuminator. If the light source is the ambient light, then the light enters the top substrate 110, goes through the color blocks 130, 140, and 150 and is reflected back through these layers by the bottom substrate 120 or by a reflector below the bottom substrate 120. If a back illuminator is used, then the light from the back illuminator enters through the bottom substrate 120, goes through the color blocks 130, 140, and 150 and exits through the top substrate 110. A color pixel 160 is formed as a result of the illumination of the component color blocks 130, 140, and 150 by the light.

The three component color blocks 130, 140, and 150 are stacked on one another in a linear manner. Each of the blocks generates a component color used in a color system. They are aligned to receive the illuminating light such that multiple component colors may be combined or fused together to form the color of the resulting pixel 160. Depending on the amount of contribution of the component color in each of the blocks, the resulting pixel may have a wide range of display colors. The color system used may be any convenient color system. In one embodiment, the color system is the cyan, magenta, yellow (CMY) system. The resulting color is the result of the generally known subtractive color mixing mechanism. In a CMY display, which uses three blocks, a relatively wide color gamut may be achieved. However, more color blocks may be added such as a black color block in order to achieve darker black states, similar to printing, or special custom colors. In some cases, one of the blocks may contain a color that is a specific company color, e.g., for advertisement purposes. Moreover, a display may include only one block, if color mixing is not required for the display application. Other than the color, the structure and organization of each of the component color blocks 130, 140, and 150 are the same. Therefore, it is sufficient to describe one of the blocks. For brevity, in the following, the component color block 130 is used.

Figure 2A:
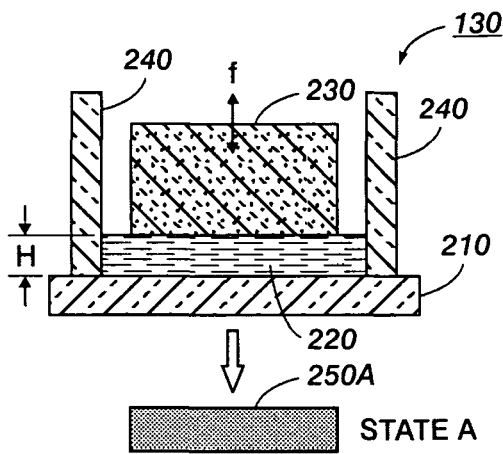
FIG. 2A is a diagram illustrating a component color block at a first state according to one embodiment.

FIG. 2 is a diagram illustrating the component color block 130 shown in FIG. 1 according to one embodiment. The component color block 130 includes a substrate layer 210, a layer of colored fluid 220, a transparent actuator element 230, and enclosure walls 240. It is noted that the component color block 130 may include more or less than the above components.

The substrate layer 210 provides mechanical and optical sealing and support for the block. For a transmissive display, it is transparent to allow optical transmission of light through the medium. For a reflective display, it may not be transparent and may be a reflective steel or aluminum foil, for example. If the block is the bottom block in the optical unit 100, it may not be needed because the bottom substrate 120 (FIG. 1) may be used. In that case the bottom substrate 120 may also be a simple reflector, such as a specular or diffuse reflecting surface. The layer 210 or substrate 120 may include a rigid material such as glass, but also a flexible material such as a polymer foil or sheet like Mylar™, plexiglass, polycarbonate, etc. The substrate may also include thin stainless steel if the display is only a reflective display.

The layer of colored fluid 220 is a layer of colored fluid in a cell on the substrate layer 210. The colored fluid is a fluid dyed in a color, or the color may originate from a pigment or from nanoparticles dispersed in a liquid as it is known that nanoparticle solutions may display a color depending on the particle size. The color may be any of the component color in the color system (e.g., cyan, magenta, yellow). The colored fluid may be an ink. Colored inks may be prepared by dissolving a dye in a solvent, e.g. an aniline dye in water. A colored fluid may also be obtained by dispersing pigments in a liquid medium, such as Hansa Yellow (Pigment Yellow 98) in ISOPAR provided by Exxon Corp. It typically has a low vapor pressure to prevent evaporation over time. The dye may also include dichroic dyes for different color effects in the reflected and transmitted mode. The colored fluid 220 may have a wide range of viscosities. For example, it may have a low viscosity, similar to water (~1 cP), which may allow fast switching speed. However, it may have a higher viscosity similar to glycerol (~1500 cP) or honey (~10,000 cP) or even higher for slower switching speed or increased bistability of a color state. The colored fluid may also include a phase-change material such as a colored wax (e.g., candle wax or Kemamide wax with dye or pigment). Such phase-change material may be beneficial for a display with bistability as the material may have to be turned into a low-viscosity state before the actuator element 230 moves. Heating, with an integrated or external heater may cause such a phase transition. In addition, irradiation with light such as UV or infrared light may cause such a phase change. The portion of the layer of colored fluid 220 directly under the element 230 has a thickness H. Since the colored fluid 220 may be modulated or displaced, the thickness H may be variable.

The transparent actuator element 230 is on the layer of the colored fluid 220. It is transparent to allow illuminating light to go through. Typically, it is made of material that has an index of refraction that is matched or close to the one of the colored or surrounding fluid to reduce refraction of light and reflection losses. The element 230 may be immersed into the colored fluid 220. It may be moved, displaced, bent, or deformed in such a way that its immersion into the colored fluid 220 modulates the thickness of the colored fluid 220, and in particular, the thickness H of the portion directly under the element 230. The movement of the element 230 may be activated by a force f. The force f may either pull or push the element 230 towards the substrate 210. The modulated thickness of the colored fluid layer 220 provides a variable optical density of the colored fluid layer 220. The variable optical density of the colored fluid layer 220 causes changes in the color contribution of the color component which means the lightness of the color is modulated. Accordingly, the lightness of the colored fluid layer 220 that contributes to the resulting pixel may be modulated or modified by the movement of the element 230. When this movement is activated or controlled by the force f, the actuation mechanism that generates the force f acts as a control mechanism to control the generation of the color of the pixel. The variation of the optical density may be in the direction of the applied force.

The transparent actuator element 230 may have a shape or size such that it may be moved in an unrestricted manner within the block 130 and the thickness H of the portion of the colored fluid 220 directly beneath it corresponds to color component of the pixel. In particular, it may be positioned such that as it travels or as it is immersed into the colored fluid 220, there is sufficient available space to allow unrestricted movement of the colored fluid 220 as the result of the immersion of the element 230. As an example, assuming a square actuator element of 1000×1000 microns and a 50 micron gap between element 230 and walls 240, a 3 micron thick layer of colored liquid may be displaced from underneath the actuator element 230 into the 50 micron wide space next to the actuator element 230. The level of colored fluid layer 220 may rise in this area from the initial 3 microns to ~15-20 microns. Therefore, the actuator element 230 may have to be at least ~20 microns high in this example. The space above the actuator element 230 may be filled with air or another gas or it may be occupied by a liquid, preferably a liquid that has a refractive index that matches the material of the actuator element 230.

The enclosure walls 240 may provide mechanical support and sealing for the block. When the block 130 is well sealed, evaporation of the colored fluid may be significantly reduced.

The block 130 may be in several states A, B, and C corresponding to several color lightness values or optical density values of the colored fluid layer 220 as a result of the modulation of the thickness H. The states A, B, and C correspond to color component states 250A, 250B, and 250C, shown in FIGS. 2A, 2B, and 2C, respectively. The first state, or state A shows the state where the colored fluid 220 is in its original state, resulting in a full color contribution in the color component state 250A.

Figure 2B:
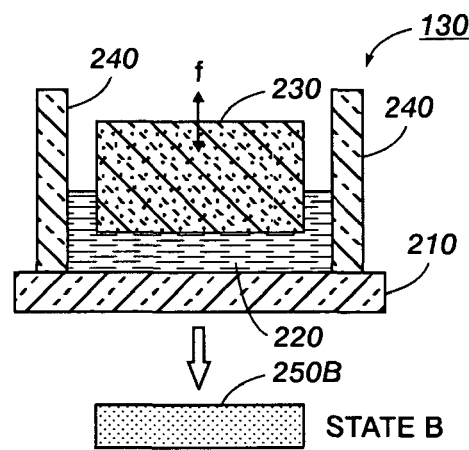
FIG. 2B is a diagram illustrating a component color block at a second state according to one embodiment.

FIG. 2B is a diagram illustrating a component color block at a second state according to one embodiment. The second state, or state B, corresponds to the color component 250B.

The state B is the state where the element 230 is moved or immersed into the colored fluid 220 such that the thickness H of the portion of the colored fluid under the element 230 is reduced, resulting in less color contribution in the color component state 250B.

Figure 2C:
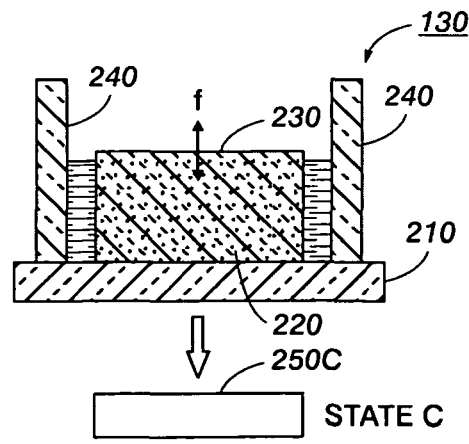
FIG. 2C is a diagram illustrating a component color block at a third state according to one embodiment.

FIG. 2C is a diagram illustrating a component color block at a third state according to one embodiment. The third state, or state C, corresponds to the color component 250C. The state C is the state where the element 230 is moved or immersed completely into the colored fluid 220 such that the thickness H of the portion of the colored fluid under the element 230 is reduced to zero, resulting in no color contribution in the color component state 250C.

Figure 3:
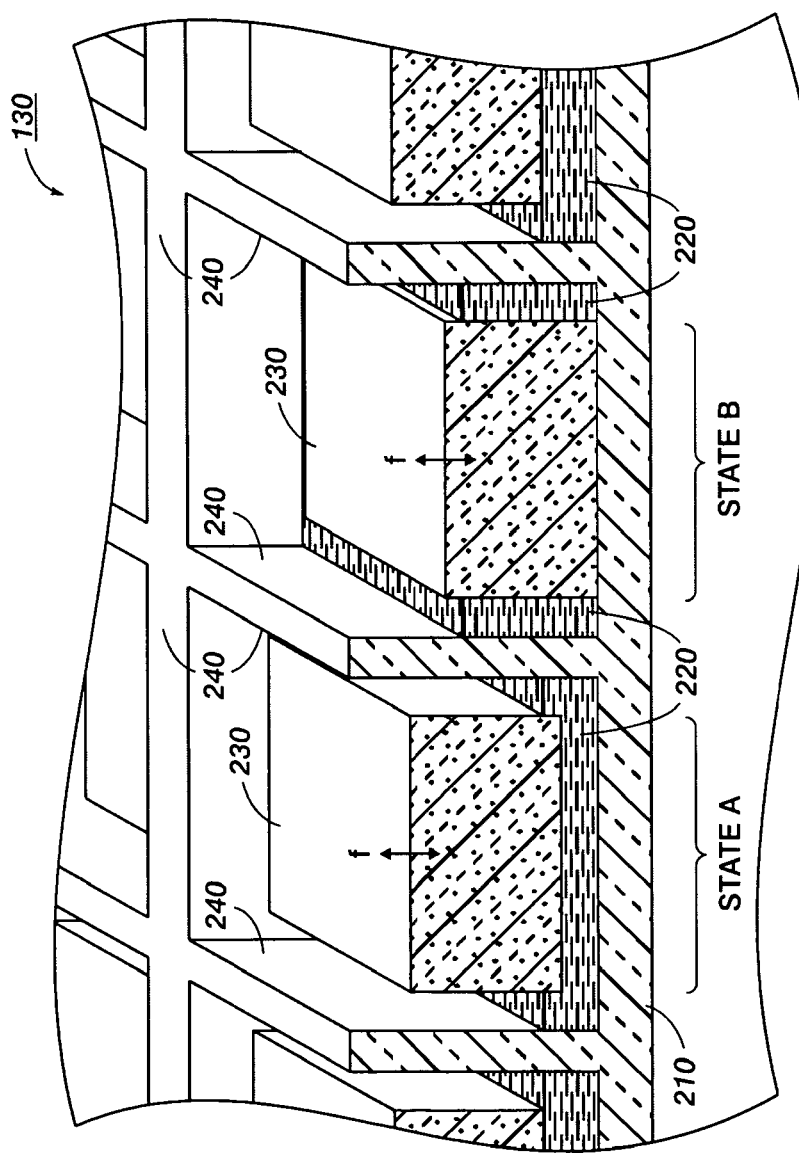
FIG. 3 is a diagram illustrating a component color block in three-dimensional space according to one embodiment.

FIG. 3 is a diagram illustrating the component color block 130 shown in FIG. 1 in three-dimensional space according to one embodiment. For clarity, not all of the components are shown. The color block 130 is shown with two states, state A and state B. In state A, the actuator element 230 is in the upward position, resulting in a dark color. In state B, the actuator element 230 is in a downward position where the thickness of the layer of colored fluid 220 is essentially zero, resulting in a light color, or no color contribution. The volume above or next to the actuator element 230 and above the colored fluid layer 220 may be filled with air or a transparent fluid which does not intermix with the colored fluid. This transparent fluid may ideally have a refractive index that is matched to the material of the actuator element 230.

The color blocks like the block 130, 140, and 150 shown in FIG. 1 may form a large display area including blocks positioned next to one another in a two-dimensional pattern. The shape of the individual blocks as seen from the top view may be any suitable geometrical shape. Some examples are shown in FIGS. 4A, 4B, 4C, and 4D.

Figure 4A:
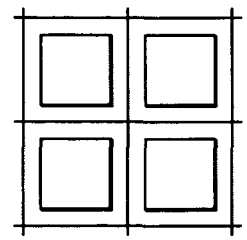
FIG. 4A is a diagram illustrating the top view of a square pattern of the adjacent color blocks according to one embodiment.

FIG. 4A is a diagram illustrating the top view of a square pattern of the adjacent color blocks according to one embodiment.

Figure 4B:
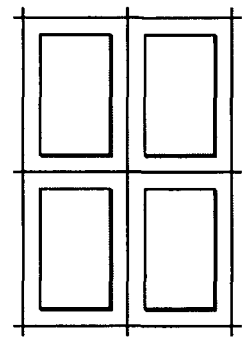
FIG. 4B is a diagram illustrating the top view of a rectangular pattern of the adjacent color blocks according to one embodiment.

FIG. 4B is a diagram illustrating the top view of a rectangular pattern of the adjacent color blocks according to one embodiment.

Figure 4C:
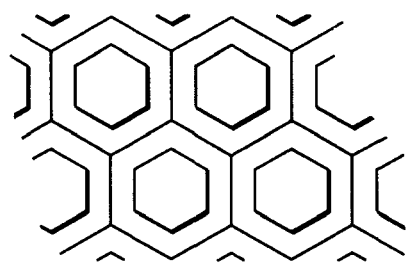
FIG. 4C is a diagram illustrating the top view of a hexagonal pattern of the adjacent color blocks according to one embodiment.

FIG. 4C is a diagram illustrating the top view of a hexagonal pattern of the adjacent color blocks according to one embodiment.

Figure 4D:
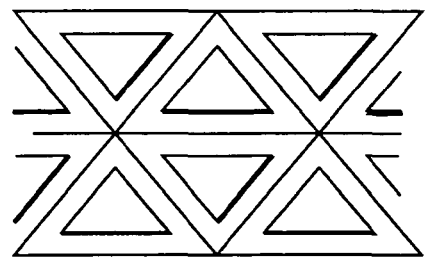
FIG. 4D is a diagram illustrating the top view of a triangular pattern of the adjacent color blocks according to one embodiment.

FIG. 4D is a diagram illustrating the top view of a triangular pattern of the adjacent color blocks according to one embodiment.

The transparent actuator element 230 may be formed by a number of ways corresponding to various embodiments of the invention.

Figure 5A:
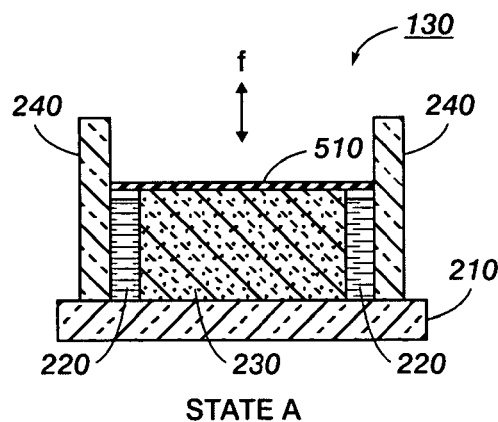
FIG. 5A is a diagram illustrating a component color block using a structure in a first state according to one embodiment.
Figure 5B:
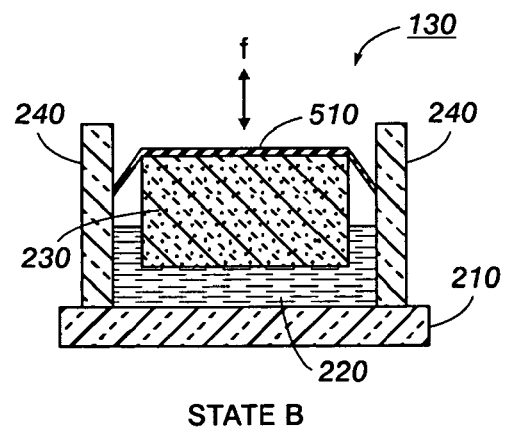
FIG. 5B is a diagram illustrating a component color block using a structure in a second state according to one embodiment.

FIG. 5A is a diagram illustrating the component color block 130 shown in FIG. 1 using a structure in a first state according to one embodiment. FIG. 5B is a diagram illustrating a component color block using a structure in a second state according to one embodiment. The transparent actuator element 230 may be a silicone, or polydimethylsiloxane (PDMS), structure that is suspended by a membrane 310. The actuator element 230 may be also made of other organic or inorganic transparent materials such as glass, sapphire, plexiglass or Poly(methyl methacrylate) (PMMA), epoxy polymer, acrylates, polycarbonate, urethanes, or other transparent polymers for example. The actuator element 230 may also include a combination of materials such as layers of several materials. In one example, the surface of the element 230 is coated with a fluoropolymer or with a silicone. The surface of element 230 or substrate 210 may also be roughened in order to prevent stiction between element 230 and substrate 210. Such roughening may be achieved by etching or sandblasting of the surface or by applying a rough surface coating such as a micro- or nanoparticle based polymer layer. Small spacer bumps may also be patterned onto either surface, e.g. by inkjet printing or other pattering methods. The actuator element 230 may be patterned by conventional machining, laser machining, molding, stamping, photolithography, etching, printing, etc. The membrane 510 may be flexible and attached to the enclosure walls 240 to restrict the movement of the element 230 within a predefined space or distance. The membrane 510 may also be attached to the actuator element 230. It may be attached by bonding, laser-welding or it may be molded or otherwise patterned from the same material as actuator element 230. The membrane 510 may be substantially transparent and cover the surface of actuator element 230 or it may be only attached around the perimeter of actuator element 230 (in this case the membrane 510 may not have to be transparent). The membrane 510 may include a variety of materials, such as Mylar, silicone, polycarbonate, PMMA, polyimide, epoxy polymer, fluorocarbon, metal, glass, etc. The thickness of the membrane is thin in order to allow movement of element 230 by applying only small forces. Typically, the membrane thickness may be 0.5 microns to 100 microns, depending on the geometry of the cell. In larger cells, extending over several millimeters or centimeters, the membrane may be made of thicker materials, e.g., several hundred microns to millimeters thick. The membrane may be attached to the side of wall 240 as shown in the figure or it may be attached to the top surface of wall 240, e.g., by a bonding method such as adhesive bonding, laser welding, ultrasonic bonding, etc. The membrane may be continuous or may be patterned into beam structures in order to lower the spring constant. A wide range of beam structure suspension geometries for mechanical elements such as micromirrors are known in the art and are not described here in detail. One example is meander-shaped beams between the walls 240 and the actuator element 230. The movement of the element 230 changes the colored fluid 220 from the first state, or state A where the fluid is in a substantially vertical position to the second state, or state B where the fluid is in a substantially planar position with respect to the substrate, or vice versa. In FIGS. 5A and 5B, the membrane 510 may provide the spring force that moves the element 230 back in contact with layer 210 when the external force f is removed. However, the geometry may also be in such a way that the in the state of zero external force, there is a gap between the element 230 and the substrate 210. In this case, the external force pulls or pushes the element 230 towards the substrate and the spring force of the membrane may pull the element 230 away from the substrate 210.

Figure 6A:
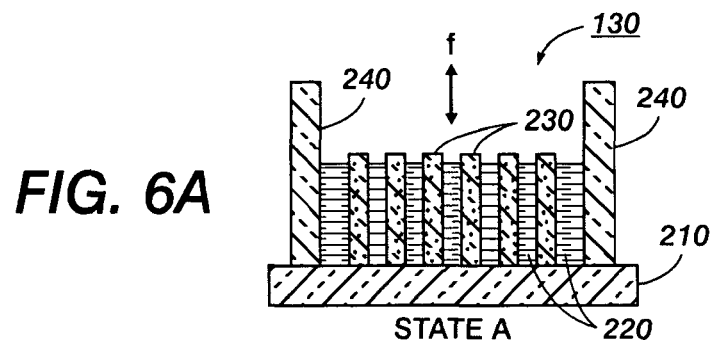
FIG. 6A is a diagram illustrating a component color block using a perforated actuator element in a first state according to one embodiment.
Figure 6B:
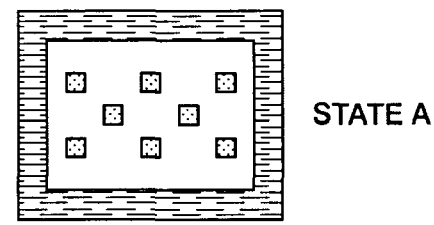
FIG. 6B is a diagram illustrating top view of the component color block using a perforated actuator element in a first state according to one embodiment.
Figure 6C:
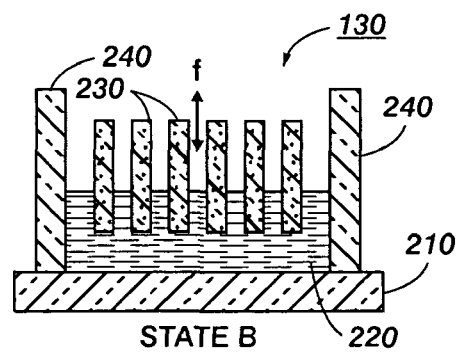
FIG. 6C is a diagram illustrating a component color block using a perforated actuator element in a second state according to one embodiment.
Figure 6D:
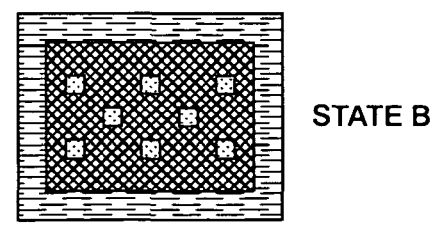
FIG. 6D is a diagram illustrating top view of the component color block using a perforated actuator element in a second state according to one embodiment.

FIG. 6A is a diagram illustrating the component color block 130 shown in FIG. 1 using a perforated actuator element in a first state according to one embodiment. FIG. 6B is a diagram illustrating top view of the component color block using a perforated actuator element in a first state according to one embodiment. FIG. 6C is a diagram illustrating a component color block using a perforated actuator element in a second state according to one embodiment. FIG. 6D is a diagram illustrating top view of the component color block using a perforated actuator element in a second state according to one embodiment. The perforated actuator element provides additional vertical space for the colored fluid to move into a vertical position. The first state, or state A, is the transparent state of the color block 130 and the second state, or state B. is the opaque state. In the transparent state, the colored fluid is moved into a substantially vertical position with regard to the substrate leaving a rather small crosssectional viewing area for the viewer who looks at the color block 130 in a direction substantially perpendicular to the substrate.

Figure 7A:
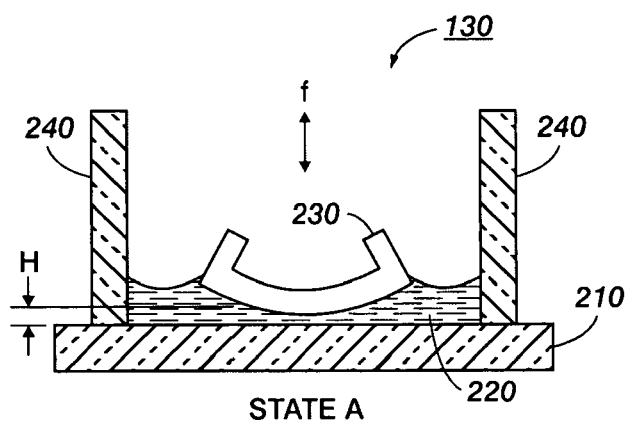
FIG. 7A is a diagram illustrating a component color block using a bimorph actuator in a first state according to one embodiment.
Figure 7B:
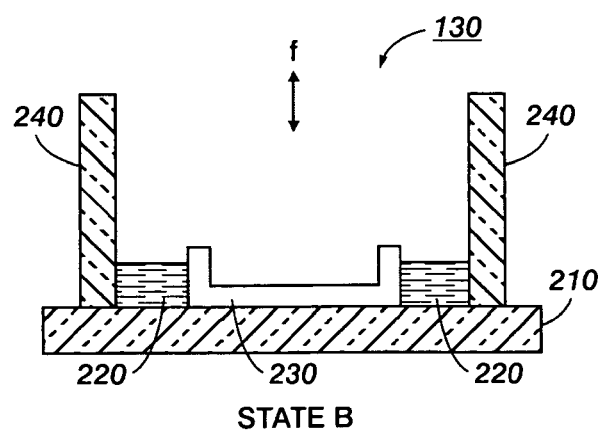
FIG. 7B is a diagram illustrating a component color block using a bimorph actuator in a second state according to one embodiment.

FIG. 7A is a diagram illustrating the component color block 130 shown in FIG. 1 using a bimorph actuator in a first state according to one embodiment. FIG. 7B is a diagram illustrating a component color block using a bimorph actuator in a second state according to one embodiment.

The transparent actuator element 230 may be a bimorph actuator, or other bending actuator. The actuator may be realized by carbon nanotubes embedded in a polymer. This actuation mechanism in carbon nanotubes may be based on expansion due to electrochemical double layer charging. The actuator may be also a polymer gel actuator and the actuation may be triggered by light or electric signals. In one example the actuator expands due to the absorption of ions in an electric field. In a conventional bimorph actuator, the element 230 may include two materials such as a polymer (e.g. Mylar) and a transparent indium tin oxide layer, for example. When the materials are heated, e.g., by passing a current through the conductive indium tin oxide layer, then the element 230 will bend due to the different thermal expansion of both materials. When activated, the bimorph may be deformed or morphed into a shape such that the resulting thickness H of the portion of the colored fluid 220 directly beneath the bimorph is non-uniform as shown in the first state, or state A. In the second state, or state B, the bimorph is flat and substantially in contact with the substrate. In this position, most of the colored fluid underneath the actuator is displaced to the sides where it assumes a substantially vertical position. The actuator element 230 may be connected to an electrode and above the actuator, as well as above the colored fluid layer 220, a transparent electrolyte may be situated. By applying a voltage between the actuator element 230 and the electrolyte, ions or electrons move towards the or away from the actuator structure. This causes a deformation and is a generally known mechanism in the art of electroactive polymers. The deformation may also originate from other forces such as electrostatic forces, e.g., if a voltage between the substrate and the actuator causes a deformation of the actuator element 230. The element 230 may be attached to the substrate 210 for example in a center region, e.g., by spot welding. It may also be attached on one outer edge and in this case the element would curl up only from one side.

Figure 8A:
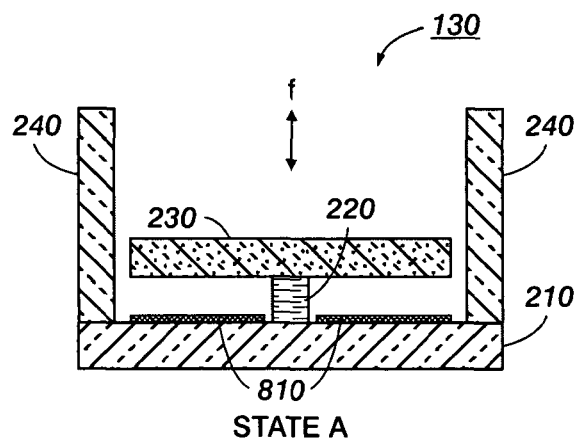
FIG. 8A is a diagram illustrating a component color block using another actuation mode in a first state to move the colored fluid from a substantially vertical into a substantially horizontal or planar position according to one embodiment.
Figure 8B:
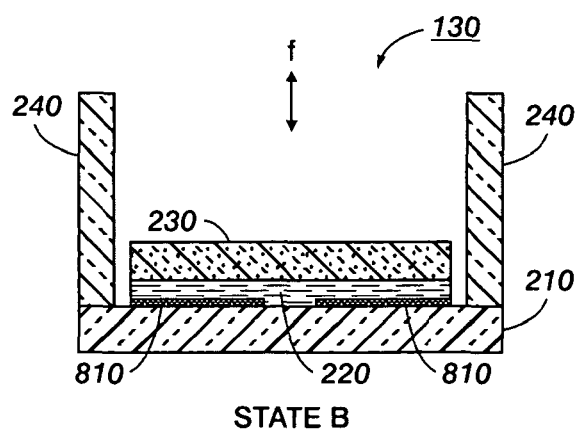
FIG. 8B is a diagram illustrating a component color block using another actuation mode in a second state to move the colored fluid from a substantially vertical into a substantially horizontal or planar position according to one embodiment.

FIG. 8A is a diagram illustrating the component color block 130 shown in FIG. 1 using another actuation mode to move the colored fluid from a substantially vertical into a substantially horizontal or planar position in a first state according to one embodiment. FIG. 8A is a diagram illustrating the component color block 130 shown in FIG. 1 using another actuation mode to move the colored fluid from a substantially vertical into a substantially horizontal or planar position in a second state according to one embodiment. The transparent actuator element 230 may be a polymer or glass actuation plate. The colored fluid 220 may be in a columnar configuration in the first state, or state A. The substrate 210 may be coated at least partially by a low-surface energy coating 810 such as a fluorocarbon polymer (e.g., Cytop from Asahi Glass or Teflon AF from DuPont). The low-surface energy coating 810 may be a coating that has a water contact angle greater than 90 degrees. The actuator element 230 may be similarly at least partially coated with a low surface energy coating. As the element 230 is activated to move down, the colored fluid 220 may be spread out like a film in the second state, or state B. The colored fluid 220 may return to its original columnar shape as the element 230 returns to its original position (state A). This is due to the requirement for conservation of volume and the lateral position of the colored fluid column may be determined by the low surface energy coating. In FIG. 8A, the low-surface energy coating is shown to cover the substrate surface, except for a center region where the fluid gets pinned (due to its higher surface energy). State A in FIG. 8A is a side view of the color block and the colored fluid layer 220 is shown in the vertical position. In this vertical position the fluid may have the shape of a circular column (circular shape as seen from top) or it may have the shape of a long wall (elongated rectangular stripe shape as seen from top). In both of these configurations of state A, the color block 130 appears substantially transparent when viewed from a direction substantially perpendicular to the substrate because the fluid column occupies only a small percentage of the total surface area of the color block. For example, assume that in state B the colored fluid layer 220 has the shape of a square disk of dimension 1000×1000×3 micrometers and in state A this layer has the shape of a wall of 1000×100×30 micrometers. In this case, the actuator element 230 moves from a height of 3 microns above the substrate (state B) to a height of 30 microns above the substrate (state A). The colored fluid layer 220 in FIG. 3D forms a wall-like column extending into the plane of the illustrated side-view. Both fluid volumes are the same, but while in state B the colored fluid layer 220 covers all of the cell area of the color block, in state A it only occupies 10 percent of the area. The color block therefore appears much more transparent to the viewer. Thin spacers on the substrate or on the actuator element 230 may serve to define the lower position (e.g., the 3 micron gap in the above example). Those spacers may be deposited (e.g., by inkjet printing) or they may be otherwise patterned into or onto the substrate or the actuator element.

Figure 9A:
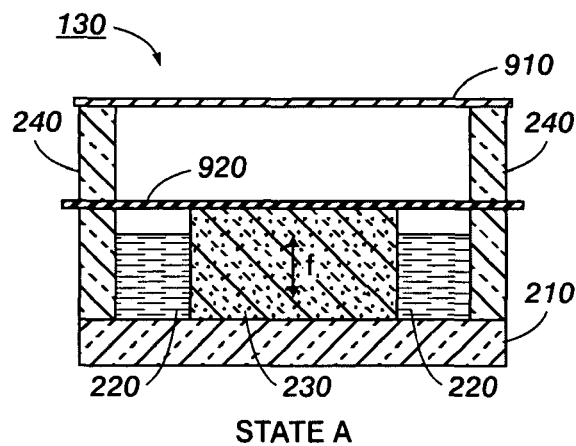
FIG. 9A is a diagram illustrating a component color block using an electrostatic force in a first state according to one embodiment.
Figure 9B:
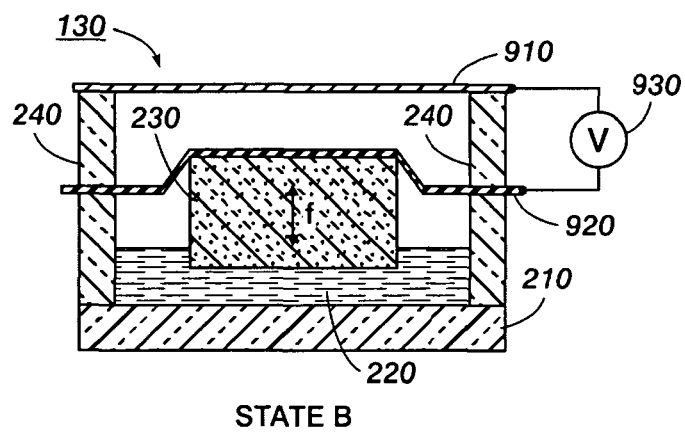
FIG. 9B is a diagram illustrating a component color block using an electrostatic force in a second state according to one embodiment.

FIG. 9A is a diagram illustrating the component color block 130 shown in FIG. 1 using an electrostatic force in a first state according to one embodiment. FIG. 9B is a diagram illustrating the component color block 130 shown in FIG. 1 using an electrostatic force in a second state according to one embodiment. The transparent actuator element 230 may be any of the structures described above. The block 130 includes a seal substrate 910 which may be the substrate layer of the upper block. This layer 910 may be a thin glass plate that is at least partially coated with a transparent conductor such as indium tin oxide, zinc oxide, Poly(3,4-ethylenedioxythiophene) poly(styrenesulfonate) (PEDOT:PSS), or it may be coated with narrow patterned lines of a non-transparent conductor such as chromium or aluminum. A membrane 920 is attached to the element 230. The membrane 920 may include a thin polymer foil made of materials such as Polyethylene terephthalate (PET), e.g., Mylar, polyethylene naphthalate (PEN), PDMS, Saran, epoxy, fluorocarbon, etc. The foil may carry a permanent charge such as in the case of an electret or it may be coated with a transparent conductor or it may be patterned with narrow lines of a non-transparent conductor. The membrane 920 may also have conducting elements, such as a network of conducting carbon nanotubes, embedded in its polymer matrix. The membrane 920 and the substrate 910 are connected to a voltage source. At the first state, or state A, there is no voltage applied and there is no electrostatic force. The element 230 is at its original position. As a voltage V 930 is applied, an electrostatic force f is generated and moves the element 230 up to change to the second state, or state B. If the membrane 920 carries a permanent charge such as in an electret, the voltage may be applied between a conductive layer on the substrate 210 and the seal substrate 910 to generate an electric field in which the membrane 920 may be deflected. As described earlier, the membrane may be patterned into beam-shaped suspension structures, such as straight, curved or meandering beams between element 230 and walls 240 to adjust the spring constant. A very similar configuration as shown in FIG. 9A and FIG. 9B may be employed in a magnetic actuation scheme. Here, the actuator element 230 or the suspension membrane 920 may contain ferromagnetic elements, such as ferromagnetic nanoparticles, patterned traces of ferromagnetic material such as nickel, magnetite, cobalt, etc. These may have been patterned or deposited by commonly known patterning methods such as printing, etching, laser ablation, evaporation, etc. In one example, magnetite nanoparticles are inkjet printed in a sparse pattern onto the top surface of actuator element 230 or suspension membrane 920. In another example, nickel traces or nickel dots are evaporated onto the surface of element 230 via a shadow mask. A coil structure which is patterned on the surface of substrate 910 generates a magnetic field which attracts the actuator element 230 when a current is passed through it. The coil may be made form a patterned layer of transparent indium tin oxide or of another patterned conducting material. Of course, the ferromagnetic element may also be attached to the substrate 910 and the magnetic field generating conducting traces may be patterned onto the actuator element 230 or suspension membrane 920.

Figure 10A:
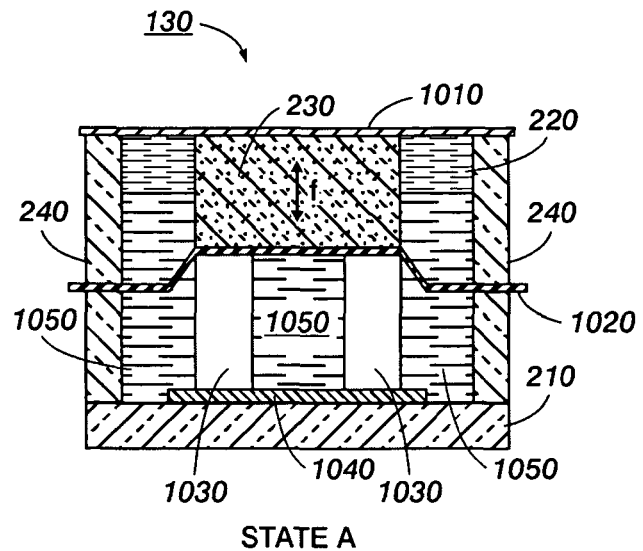
FIG. 10A is a diagram illustrating a component color block using an electro-active polymer (EAP) in a first state according to one embodiment.
Figure 10B:
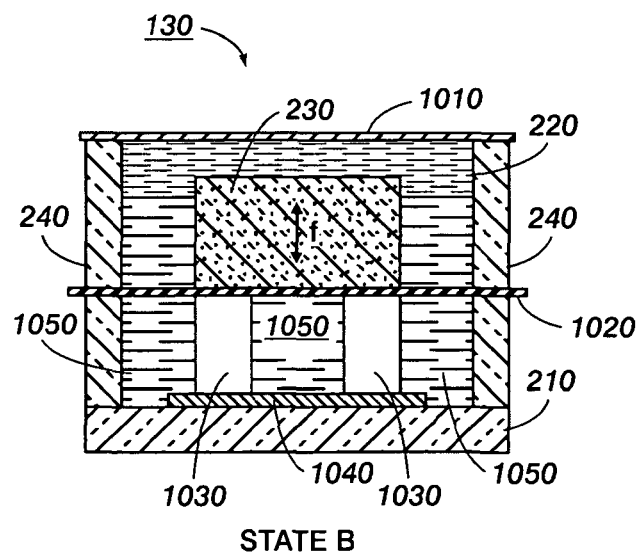
FIG. 10B is a diagram illustrating a component color block using an electro-active polymer (EAP) in a second state according to one embodiment.

FIG. 10A is a diagram illustrating the component color block 130 shown in FIG. 1 using an electro-active polymer (EAP) in a first state according to one embodiment. FIG. 10B is a diagram illustrating the component color block 130 shown in FIG. 1 using an electro-active polymer (EAP) in a second state according to one embodiment. A seal substrate 1010 may be attached to the walls 240 to form a chamber. The transparent actuator element 230 may be any of the structures described above. It may be suspended by a membrane 1020. Its movement may be actuated by an electro-active polymer (EAP) 1030. An example of an electroactive polymer is reversibly redox tunable, swellable and shrinkable metallopolymer gels such as a weakly cross-linked polyferrocenylsilane. The block 130 includes an electrode 1040 and an electrolyte 1050 to provide electrical activation for the EAP 360. The electrolyte 1050 may be a transparent ionic fluid that fills the chamber. The EAP 1030 may be positioned between the substrate layer 210 and the actuator element 230. The EAP 1030 may expand or contract to move the transparent actuator element 230 when a voltage is applied to the electrode that causes ion diffusion through the electrolyte 1050. In FIG. 10A, the EAP 1030 expands in the first state, or state A, to push the element 230 upward. In FIG. 10B, the EAP 1030 contracts in the second state, or state B, to move the element 230 down. Various electroactive polymer materials are possible, including polymer gels or stacks of piezoelectric polymers (piezoelectric polymers do not require the surrounding electrolyte and the electrolyte 1050 may be replaced by an index-matching fluid). An example of piezoelectric polymers is Polyvinylidene Fluoride (PVDF) or PVDF-trifluoroethylene (TrEF) copolymer. The structure in FIGS. 10A and 10B may also contain reservoir regions or the membrane 920 may contain holes to compensate for volume changes. Other electrically actuated gels and artificial muscle actuators may be employed. Example materials are polyacrylic acid polyvinylalcohol gels or polyvinylalcohol gels swollen with dimethylsulfoxide. These gels may either bend or swell in an electric field.

Figure 11A:
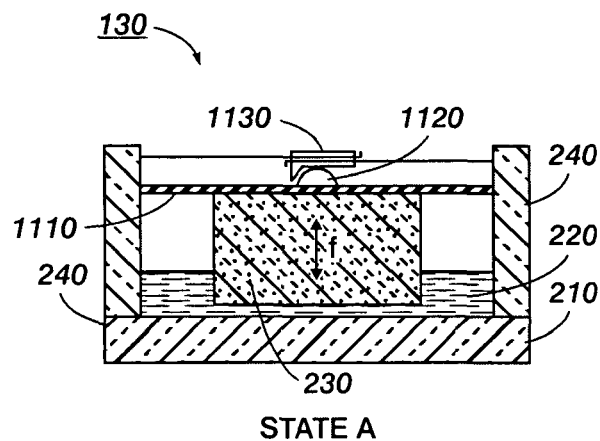
FIG. 11A is a diagram illustrating a component color block using a shape memory actuator in a first state according to one embodiment.
Figure 11B:
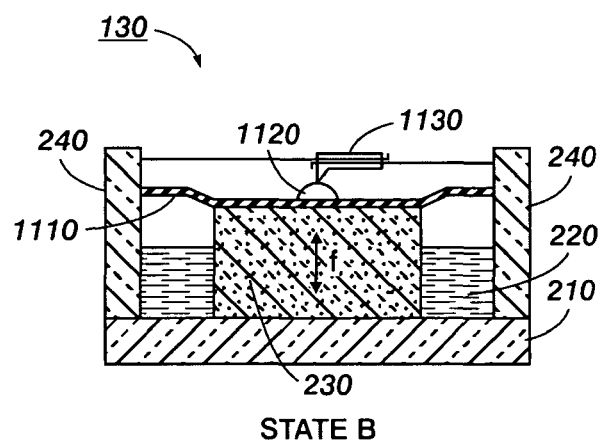
FIG. 11B is a diagram illustrating a component color block using a shape memory actuator in a second state according to one embodiment.

FIG. 11A is a diagram illustrating the component color block 130 shown in FIG. 1 using a shape memory actuator in a first state according to one embodiment. FIG. 11B is a diagram illustrating the component color block 130 shown in FIG. 1 using a shape memory actuator in a second state according to one embodiment. The transparent actuator element 230 may be any of the structures described above. The transparent actuator element 230 may be attached to a membrane 1110. The actuation mechanism for the actuator element 230 may be provided by a shape-memory actuator 1130. The top of the element 230 may be cam head 1120 that is shaped to fit the shape-memory actuator 1130 such that a horizontal movement of the shape-memory actuator 1130 causes a vertical movement of the actuator element 230. In FIG. 11A, the shape-memory actuator 1120 is at an original position and the element 230 and the fluid layer 220 are in the first state, or state A. In FIG. 11B, the shape-memory actuator 1120 moves horizontally pushing the element 230 downward in the second state, or state B. The membrane 1110 may provide the suspension for the actuator element 230 and it may also provide the spring-force that moves the element 230 into the up position. The shape memory actuator 1130 provides the force to bend the membrane 1110 and the element 230 downwards. However, the element 230 may also be directly coupled to the shape memory actuator 1130 so that the actuator 1130 provides the force for up and down movement.

Figure 12A:
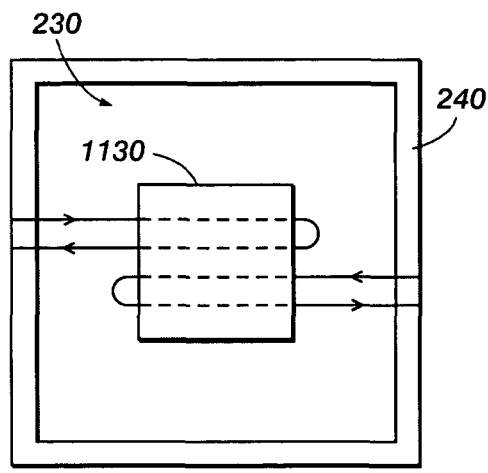
FIG. 12A is a diagram illustrating a top view of a shape memory actuator according to one embodiment.
Figure 12B:
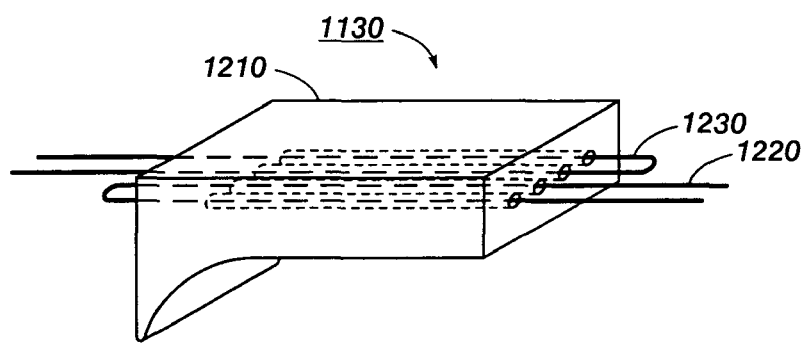
FIG. 12B is a diagram illustrating a side view of a shape memory actuator according to one embodiment.

FIG. 12A is a diagram illustrating a top view of the shape memory actuator 1130 shown in FIGS. 11A and 11B according to one embodiment. FIG. 12B is a diagram illustrating a side view of the shape memory actuator 1130 shown in FIGS. 11A and 11B according to one embodiment. The shape-memory actuator 1130 includes a cam structure 1210 and a wire assembly. The wire assembly may include wires 1220 and 1230. The cam structure 1210 may be shaped to fit the cam head 1120 of the element 230 when in state A where the element 230 is in an upward position. The two wires 1220 and 1230 are loops around the cam structure 1210 and attached to two sides of the enclosure walls 240. The wire 1220 and 1230 may be thermally activated by electric current. TiNi (NiTinol) is a typical shape memory compound and wire made of this material is commercially available. As current passes through the wires, heat is generated causing the wires to contract due to the shape memory effect. As current is reduced or turned off, the wires are cooled down and expand. The expansion and contraction of the shape-memory wires 1220 and 1230 cause the cam structure 1210 to move, or shuttle, horizontally back and forth. At state B, the cam structure 1210 is moved such that it pushes the actuator element 230 down. In other words, the wire assembly of the wires 1220 and 1230 causes a horizontal movement of the cam structure 1210 when an electrical current is applied. The horizontal movement of the cam structure 1210 causes a vertical movement of the actuator element 230. It is noted that the arrangement and design of the shape memory actuator 1130 shown in FIGS. 11A, 11B, 12A and 12B are merely for illustrative purposes.

Figure 13A:
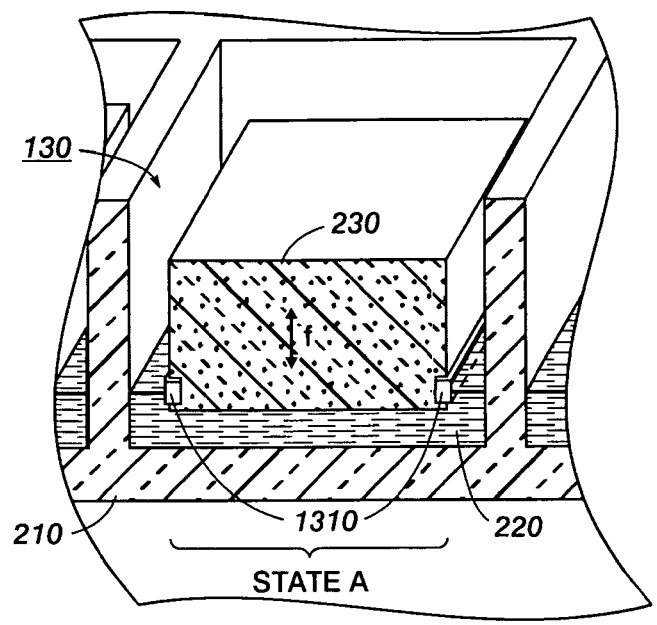
FIG. 13A is a diagram illustrating a component color block using a bi-stable display operation in a first state according to one embodiment.
Figure 13B:
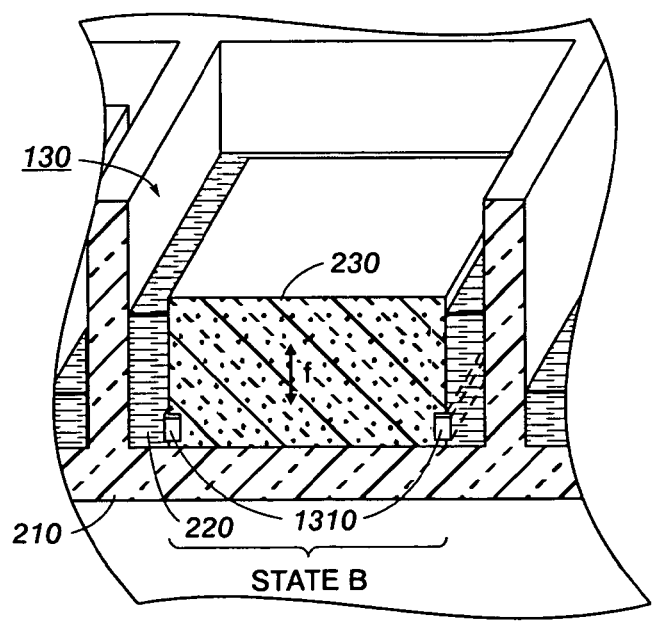
FIG. 13B is a diagram illustrating a component color block using a bi-stable display operation in a second state according to one embodiment.

FIG. 13A is a diagram illustrating the component color block 130 shown in FIG. 1 using a bi-stable display operation in a first state according to one embodiment. FIG. 13B is a diagram illustrating the component color block 130 shown in FIG. 1 using a bi-stable display operation in a second state according to one embodiment. Bi-stability may be used in a display for low power consumption. Some actuation mechanisms, such as electrostatic actuation, do not provide bi-stability unless used in a latching design. The transparent actuator element 230 may be any of the structures described above. The movement of the colored fluid 220 may have to overcome an energy barrier caused by a low surface energy barrier 1310. The low surface energy barrier 1310 may cause a bistable state of the actuator element 230. It may be formed by a hydrophobic material arranged along the edges of the actuator element 230. Such material may be a fluorocarbon polymer such as Teflon (DuPont) or Cytop (Asahi Glass) or Parylene. The energy barrier is generated in this embodiment by the requirement of the fluid to move past the hydrophobic structure in order to change from the first state, or state A, shown in FIG. 13A, to the second state, or state B, shown in FIG. 13B. The colored fluid 220 may be chosen so that its movement is repelled, or inhibited, by the hydrophobic barrier. In one example, the dyed or colored fluid 220 is water based and the low-surface energy barrier 1310 is made of Teflon. The low-surface energy barrier 1310 may be patterned by photolithography and etching, by ink-jet printing, by shadow-mask evaporation. Although the low surface energy barrier is only illustrated as part of element 230, it may also or additionally be patterned on the substrate 210 or walls 240 in FIGS. 2A, 2B, and 2C.

The actuation mechanism of the transparent actuator element 230 may cause a force to move the transparent actuator element 230. The force may be caused by one of a mechanical force, a bimetallic actuation, a thermal actuation, an electric field, a magnetic field, an electro-magnetic field, an electrostatic force, a deformation of an electroactive polymer or a deformable polymer, and a shape-memory actuator. The addressing scheme for all the described displays may be based on active matrix addressing in which active matrix pixel circuits are patterned and connected to the color elements. The pixels may provide a current or an electric potential in order to address the individual color elements.

A dynamic actuation mechanism may rely on viscosity differences between CMY inks. Similar driving mechanisms have been proposed by E-ink for color electrophoretic displays in which the mobility of particles is different for each color. A pulse generator may be used to generate a suitable pulse. A short pulse (of the actuation force) may deflect a structure with low viscosity ink but not the one with high viscosity ink. A long pulse may deflect a structure with high viscosity ink but it also deflects the one with low viscosity ink. However, the structure with low-viscosity ink returns faster to its un-deflected state. By selecting and appropriate sequence of short and long pulses, several color states can be achieved in a stack of color cells. In this driving scheme the force, electric field or other mechanical force, may be applied across all the stacked cells.

The actuation of individual cells may also occur by providing an electrode to each individual cell. This may require vertical vias to each layer. For larger display cells, other actuation schemes may be applied. For example, a microphone membrane may be used to deflect a patterned polydimethylsiloxane (PDMS) membrane.

Figure 14A:
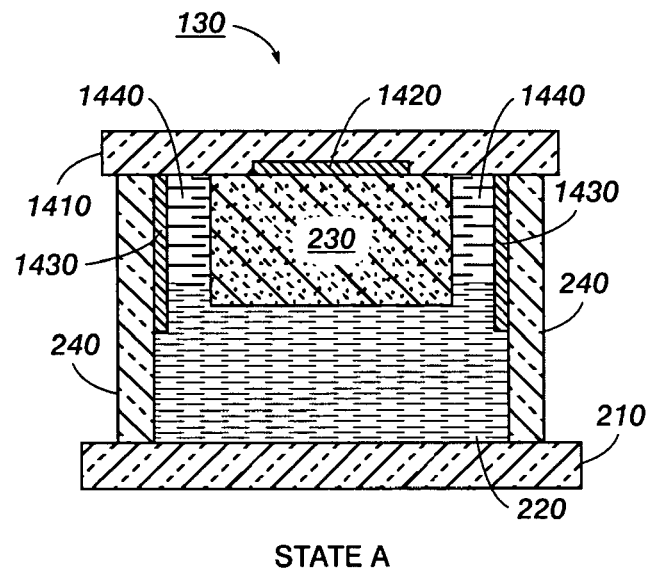
FIG. 14A is a diagram illustrating a component color block using an electroactive polymer in a first state according to one embodiment.
Figure 14B:
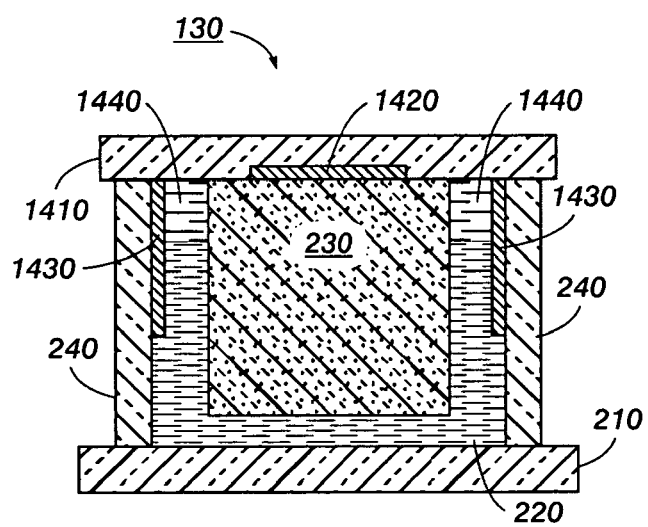
FIG. 14B is a diagram illustrating a component color block using an electroactive polymer in a second state according to one embodiment.

FIG. 14A is a diagram illustrating a component color block 130 shown in FIG. 1 using an electroactive polymer in a first state according to one embodiment. FIG. 14B is a diagram illustrating a component color block 130 shown in FIG. 1 using an electroactive polymer in a second state according to one embodiment. A transparent electrode 1420 may be attached to a seal substrate 1410. Electrodes 1430 may be attached to the enclosure walls 240, but other electrode configurations are possible. An electrolyte 1440 may be provided between the electrodes 1420 and 1430. An electrolyte is a substance containing free ions and an example may be ammonium chlorite $NaClO_4$. Also solid polymer electrolytes such as polyacrylonitrile plasticised with propylene carbonate and ethylene carbonate containing 1.0 M $NaClO_4$ may be used in conjunction with electroactive polymers. The colored fluid 220 may be an oil that does not mix with the electrolyte 1440. The actuator element 230 is an electroactive polymer (EAP) that may have volume change upon activated by an electrical voltage. Conducting polymers such as polypyrrole (PPy) and poly-3,4-ethylenedioxythiophene (PEDOT) may undergo volumetric changes as they are oxidized or reduced. When a voltage is applied to electrodes the electrodes 1420 and 1430, the actuator element 230 is expanded. The expansion of an ionic electroactive polymer is based on the transfer and diffusion of ions throughout the polymer. In one example the expansion is due to by ion (e.g., chlorate ion) and water absorption. When the voltage is removed or reversed, the actuator element 230 contracts and resumes its original shape. The volume change may also be caused by a reversibly redox tunable swellable-shrinkable metallopolymer gel such as polyferrocenylsilane.

Figure 15:
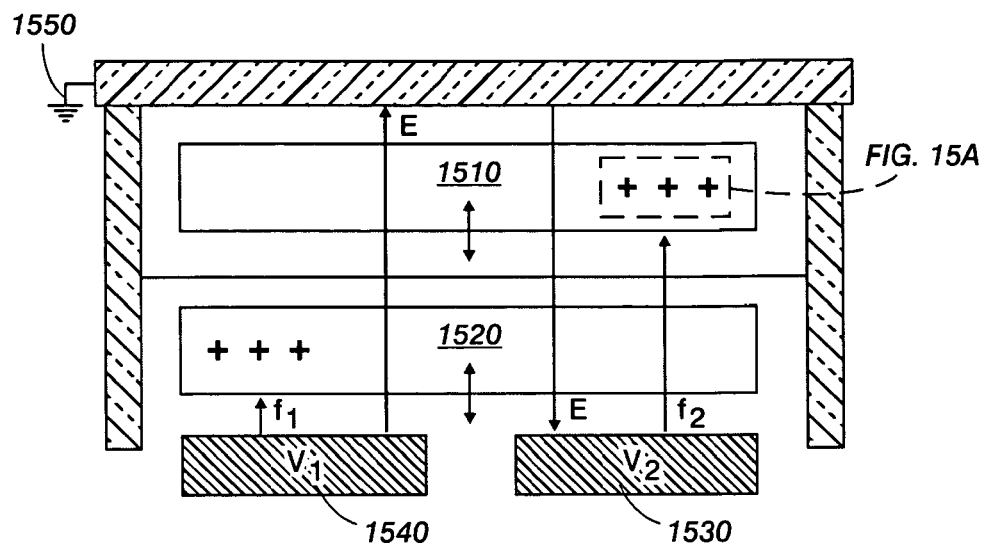
FIG. 15 is a diagram illustrating a pixel addressing using localized charges according to one embodiment.
Figure 15A:
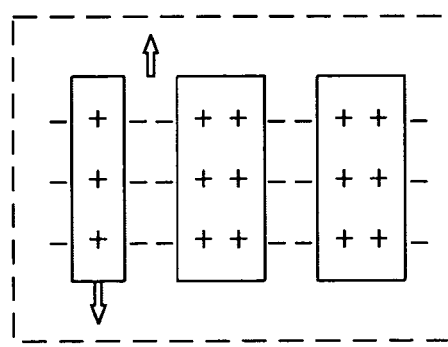
FIG. 15A is a diagram illustrating localized charges according to one embodiment.

FIG. 15 is a diagram illustrating a pixel addressing using localized charges according to one embodiment. FIG. 15A is a diagram illustrating localized charges according to one embodiment. The address scheme may be illustrated by two elements 1510 and 1520, but it may be extended to more than two elements.

The two elements 1510 and 1520 correspond to the transparent actuator elements in the stacked blocks as shown in FIGS. 1 and 2. The elements 1510 and 1520 may extend over several pixels. In this example, two pixel electrodes 1530 and 1540 are shown. A counter-electrode 1550 is shown. Each of the elements 1510 and 1520 may be locally charged by electric charge or magnetic particles. The pixel electrode directly underneath the region that is locally charged causes a force to move the element. A voltage between the pixel electrode and the counter plate at the top generates an electric field in which the charge moves. In the case of magnetic particles, the particles move in a magnetic field gradient. In FIG. 15A, the negative counter-ions are in the surrounding fluid and the cancel the charges on the actuator element 1510. When a field is applied, the positively charged actuator element 1510 and the negative counter charges move in opposite directions.

The charge or localized magnetic property may be attached to the element by any suitable technique such as by a printing process. A charging compound (e.g., a silane or other commonly known compound) or charge director (e.g. a metal salt) commonly used in the art of electrophoretic toner may be added to the polymer. The polymer may also be locally charged by e-beam writing to form an electret. In the case of electric charge, the pixel electrodes may be capacitor plates and an electric field may be established between the pixel electrode and an opposing counter-plate which may be held at a ground potential. In a dielectric liquid, the elements 1510 and 1520 may be porous, e.g., containing holes, in the region of the charge so that the counter charge may be stripped off when the element is moving. The charge may be localized in the material on the surface. Negative charge may cause the element to move up and positive charge may cause the element to move down.

In case of magnetic actuation, the magnetic particles may be embedded nano-particles (e.g., iron oxide, nickel) by suitable process (e.g., inkjet printing) or micro-magnets (e.g., NdFeB) for larger pixel sizes. Each pixel may include a small coil with an optional ferrite core. Magnetic addressing may be suitable for large pixel displays.

Figure 16:
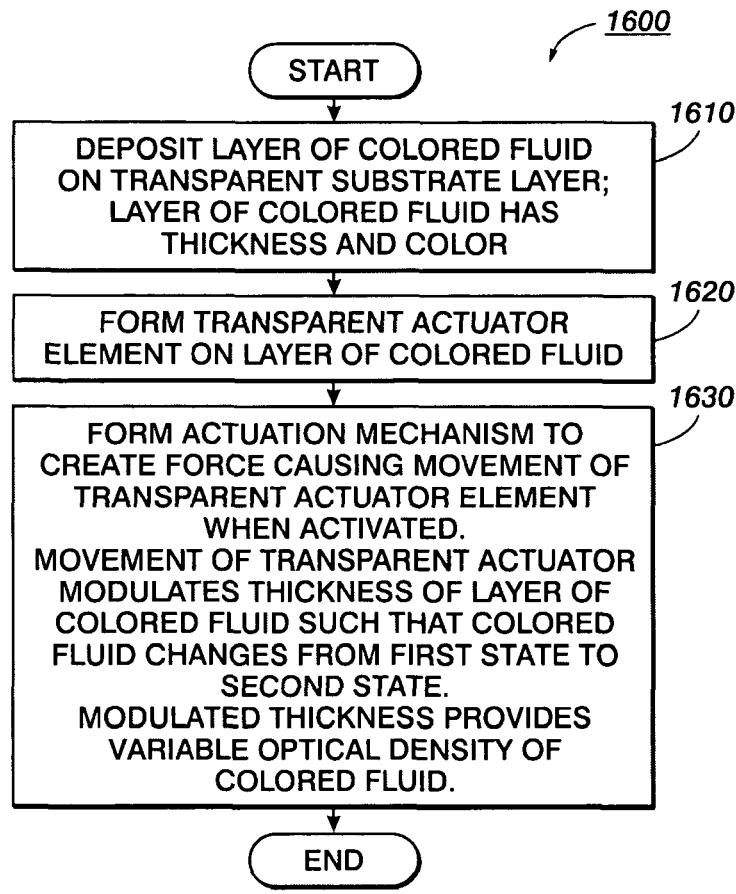
FIG. 16 is a flowchart illustrating a process to construct a display unit according to one embodiment.

FIG. 16 is a flowchart illustrating a process 1600 to construct a display unit according to one embodiment.

Upon START, the process 1600 deposits a layer of colored fluid on a substrate layer (Block 1610). The layer of colored fluid has a thickness and a color. Then, the process 1600 forms a transparent actuator element on the layer of the colored fluid (Block 1620). Next, the process 1600 forms an actuation mechanism to create a force causing movement of the transparent actuator element when activated (Block 1630). The movement of the transparent actuator element modulates the thickness of the layer of colored fluid that is underneath the actuator element. The modulated thickness provides a variable optical density of the colored fluid. The process 1600 is then terminated.

Figure 17:
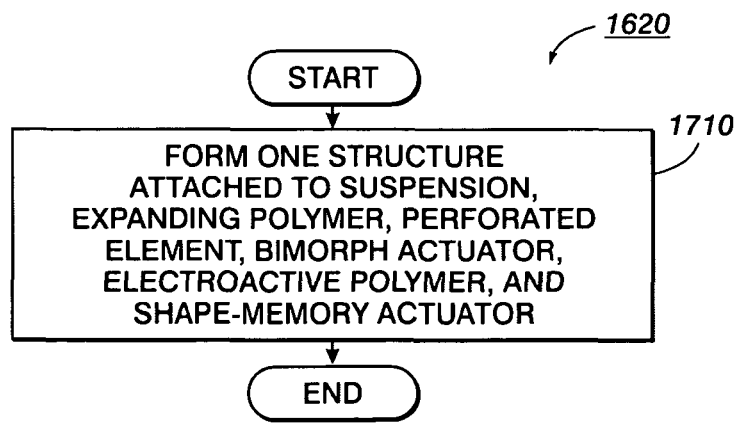
FIG. 17 is a flowchart illustrating a process to form an actuator element according to one embodiment.

FIG. 17 is a flowchart illustrating the process 1620 shown in FIG. 16 to form an actuator element according to one embodiment.

Upon START, the process 1620 forms one of a silicone structure attached to a suspension membrane, a perforated actuator element, an expanding polymer, a bimorph actuator, and an electro-active polymer. The process 1620 is then terminated.

Figure 18:
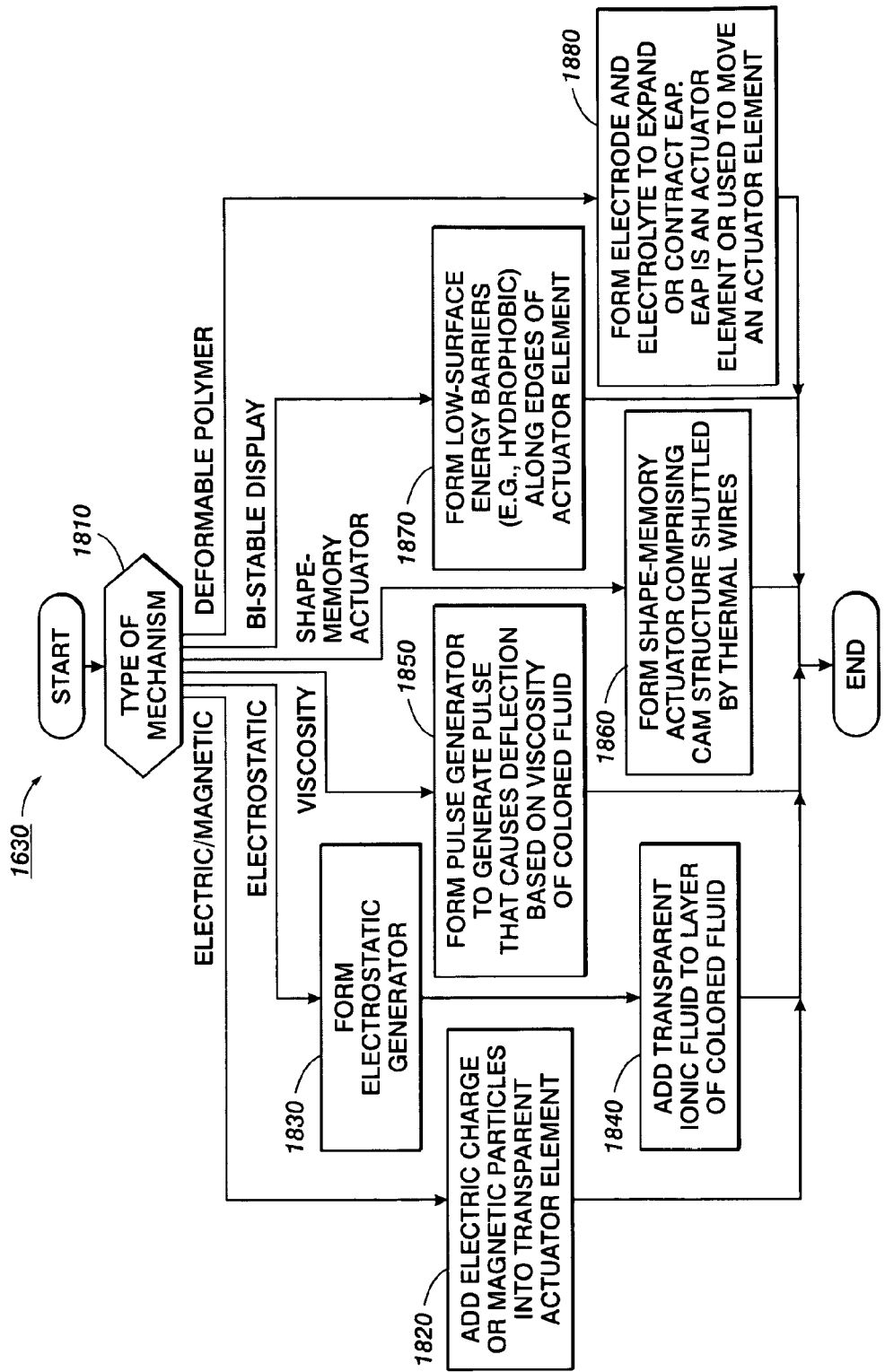
FIG. 18 is a flowchart illustrating a process to form an actuation mechanism according to one embodiment.

FIG. 18 is a flowchart illustrating the process 1630 shown in FIG. 16 to form an actuation mechanism according to one embodiment.

Upon START, the process 1630 determines the type of mechanism (Block 1810). If it is an electric or magnetic mechanism, the process 1630 adds electric charge or magnetic particles into the transparent actuator element (Block 1820) and is then terminated. If the type of mechanism is an electrostatic mechanism, the process 1630 forms an electrostatic generator (Block 1830). Then, the process 1630 adds transparent ionic fluid to the layer of colored fluid (Block 1840) and is then terminated. If the type of mechanism is based on viscosity, the process 1630 forms a pulse generator to generate a pulse that causes deflection of the actuator element based on the viscosity of the colored fluid (Block 1850). The process 1630 is then terminated. If the type of mechanism is a shape memory actuator, the process 1630 forms a shape memory actuator comprising a cam structure shuttled by thermal wires (Block 1860) and is then terminated. The thermally induced horizontal movement of the cam structure causes a vertical movement of the actuator element. If the type of mechanism is a bi-stable display operation, the process 1630 forms a low surface energy barrier (e.g., hydrophobic barrier) along the edges of the actuator element (Block 1870) and is then terminated. If the type of mechanism is deformable polymer, the process 1630 forms an electrode or electrodes and electrolyte to expand or contract the electroactive polymer (EAP) (Block 1880). The EAP may be the actuator element itself or may be used to move the actuator element. The process 1630 is then terminated.

All or part of an embodiment may be implemented by various means depending on applications according to particular features, functions. These means may include any one of mechanical, solid, liquid, optical, sonic, electro-mechanical, electro-optical, electric, magnetic components, or any combination thereof.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:
   a substrate layer;
   a layer of colored fluid on the substrate layer, the layer of colored fluid having a thickness and a color; and
   a transparent actuator element on the layer of the colored fluid to modulate the thickness of the colored fluid upon being activated by a force such that the colored fluid is changed from a first state to a second state or vice versa, the modulated thickness providing a variable optical density of the colored fluid,
   wherein the transparent actuator element comprises a structure being a bimorph actuator,
   wherein, in the first state,
      the bimorph actuator is morphed, and
      the thickness of a portion of the colored fluid beneath the bimorph actuator is non-uniform, and
   wherein, in the second state,
      the bimorph actuator is flat and substantially in contact with the substrate layer, and
      the thickness of the portion of the colored fluid beneath the bimorph actuator in the first state is displaced to sides of the bimorph actuator.

2. The apparatus of claim 1 wherein the bimorph actuator comprises one of:
   carbon nanotubes embedded in a polymer;
   a polymer gel actuation triggered by light or an electrical signal; and
   a polymer and a transparent oxide layer.

3. The apparatus of claim 1 wherein the force is caused by one of a mechanical force, a bimetallic actuation, a thermal actuation, an electric field, a magnetic field, an electro-magnetic field, an electrostatic force, and a deformation of an electroactive polymer.

4. The apparatus of claim 1 wherein the color is one of cyan, magenta, yellow, and black.

5. The apparatus of claim 1 wherein the colored fluid has a viscosity ranging from approximately 1 cP to approximately 10,000 cP.

6. A method comprising:
   stacking a plurality of layers of colored fluid on each other, each of the colored fluid having a color and a thickness and being on a substrate layer; and
   activating a force on a transparent actuator element on each of the layers of the colored fluid to modulate the thickness such that the colored fluid is changed from a first state to a second state or vice versa, the modulated thickness providing a variable optical density of the colored fluid,
   wherein the transparent actuator element comprises a structure being a bimorph actuator,
   wherein, in the first state,
      the bimorph actuator is morphed, and
      the thickness of a portion of the colored fluid beneath the bimorph actuator is non-uniform, and
   wherein, in the second state,
      the bimorph actuator is flat and substantially in contact with the substrate layer, and
      the thickness of the portion of the colored fluid beneath the bimorph actuator in the first state is displaced to sides of the bimorph actuator.

7. The method of claim 6 wherein activating the force comprises:
   applying the force being one of a mechanical force, a bimetallic actuation, a thermal actuation, an electric field, a magnetic field, an electro-magnetic field, an electrostatic force, and a deformation of an electroactive polymer.

8. The method of claim 6 wherein the colored fluid has a columnar shape such that the colored fluid is spread out in the first state as the actuator element moves down and returns to the columnar shape in the second state as the actuator element moves up.

* * * * *